E. M. DEAL.
WHEEL.
APPLICATION FILED SEPT. 22, 1909. RENEWED JAN. 18, 1912.
1,025,790.
Patented May 7, 1912.
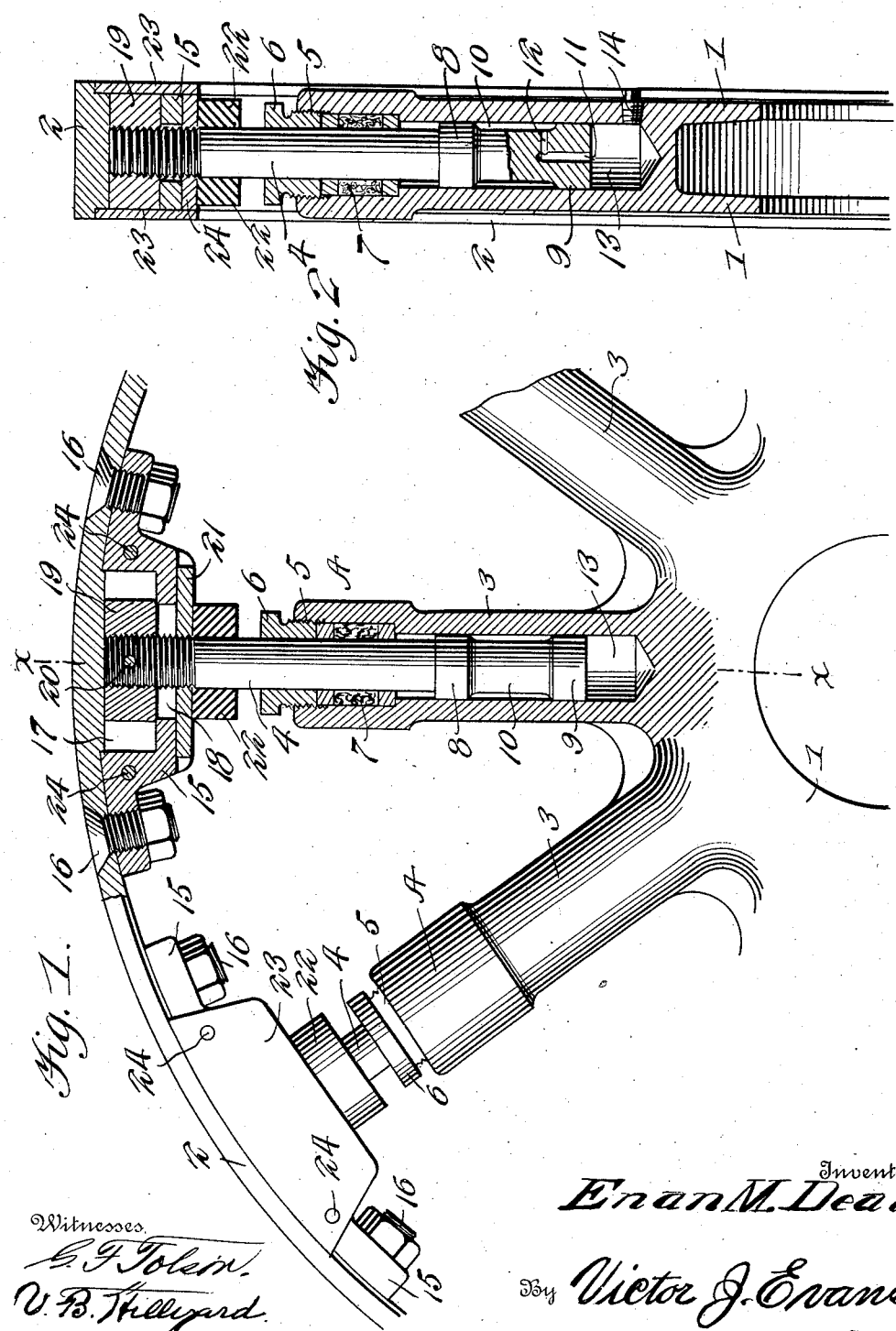

UNITED STATES PATENT OFFICE.

ENAN M. DEAL, OF PHILADELPHIA, PENNSYLVANIA, ASSIGNOR TO EDWARD A. SCHNEIDER, OF PHILADELPHIA, PENNSYLVANIA.

WHEEL.

1,025,790.        Specification of Letters Patent.        Patented May 7, 1912.

Application filed September 22, 1909, Serial No. 518,932. Renewed January 18, 1912. Serial No. 671,885.

*To all whom it may concern:*

Be it known that I, ENAN M. DEAL, a citizen of the United States, residing at Philadelphia, in the county of Philadelphia and State of Pennsylvania, have invented new and useful Improvements in Wheels, of which the following is a specification.

The present invention appertains to vehicle wheels and more particularly to the variety provided with yieldable rims so as to absorb or neutralize vibration and prevent transmission of jar or shock to the occupant of the conveyance or carrier mounted upon wheels embodying the invention.

The invention contemplates telescoping spokes interposed between the hub and rim and novel mountings and connections for said spokes and between them and the rim and hub whereby the rim is adapted to yield and move so as to take up vibration and at the same time withstand lateral stress thereby preventing displacement of the rim in the event of the wheel being subjected to lateral strain.

The invention also contemplates fluid cushioning means between the spoke element whereby the rim may readily yield to take up vibration or shock and as easily assume a given position so that in operation the wheel may not differ from the type of wheels provided with soft treads.

The invention further consists of the peculiar mountings and connecting means between the outer spoke elements and the rim whereby the latter may have a relative circumferential play with reference to certain spokes to admit of the yielding movement of the rim when the wheel is in active operation.

The invention also further consists of the novel features, details of construction and combination of parts which hereinafter will be more particularly set forth, illustrated and finally claimed.

Referring to the drawings hereto attached forming a part of the specification, Figure 1 is a fragmentary view in elevation of a vehicle wheel embodying the invention, one of the spokes and a portion of the rim being in section. Fig. 2 is a transverse section on the line *x—x* of Fig. 1.

Corresponding and like parts are referred to in the following description and indicated in both views of the drawings by the same reference characters.

The wheel comprises a hub 1, rim 2 and spokes A. The rim 2 may be of any construction and is movable with reference to the remaining portion of the wheel so as to compensate for vibration. The hub 1 may be of any design according to the finish or style of the wheel.

The spokes A comprise telescoping members the latter consisting of cylinders 3 and rods 4, the cylinders being formed with the hub 1, although such construction is not essential. Each cylinder or spoke member 3 is provided at its outer end with a stuffing box 5 including the usual packing gland 6 and packing 7. The piston rods 4 operate through the stuffing boxes and are provided at their inner ends with pistons which fit the respective cylinders in a manner to prevent passage of fluid thereby. Each piston comprises spaced heads 8 and 9 between which an annular space 10 is formed. In the preferred construction the rods 4 and pistons are formed together thereby reducing the parts and avoiding a number of joints. An opening 11 extends inward a short distance from the inner end of each piston and communicates with the lateral opening 12 which extends into the space 10 with the result that communication is had between the inner end of the cylinder and the space 10. When the parts are assembled a space 13 is provided between the inner ends of the piston and cylinder and is adapted to receive a fluid medium such as oil which serves as cushioning means and to retard the movement of the spoke members. The fluid medium is admitted into the space 13 through an opening which is closed by means of a plug 14. The outer end of each spoke member 4 has both adjustable and slidable connections with the rim.

A series of guides 15 are provided upon the rim 2 and by preference are formed separate therefrom and attached thereto by means of bolts or fastenings 16. Each guide 16 has its middle portion spaced from the rim as indicated at 17, the space 17 extending through opposite sides of the guide. A slot 18 is provided in the part of the guide spaced from the rim and receives the outer end of the spoke member 4 and admits of a relative circumferential play of the rim. The outer end of the spoke member is threaded and receives a cross head 19 which is held in place by means of a pin 20. The cross head 19 operates in the space 17. The slot 18 in the middle portion of the guide 15 is closed by means of a plate 21 which is mounted upon the threaded end of the spoke member 4 so as to move therewith. A buffer 22 is mounted upon each spoke member 4 and is held against the plate 21 and receives the impact incident to inward movement of the rim. The buffer 22 consists of a rubber block slipped upon the outer portion of the spoke member 4 so as to come between the outer end of the spoke member 3 and the plate 21. The space 17 is closed at opposite sides by means of plates 23 which are secured against opposite sides of the guide 15 with their outer edge portions let into recesses formed in opposite edges of the rim 2. Suitable fastenings or pins 24 pass through openings formed in the plates 23 and guide 15 and serve to hold the plates 23 in place.

When the parts are properly assembled they assume the position about as indicated in the drawing, a liquid such as oil being supplied to the inner end of each cylinder or spoke member 3. When the rim is subjected to perpendicular pressure incident to the load coming thereon it moves relatively upward thereby subjecting the liquid 13 to pressure, said liquid passing from the space 13 through the openings 11 and 12 into the space 10 and at the same time there is a relative play between the rim and spokes in the plane of the wheel which is provided for by the tangential slots 18 of the guides 15. It is to be understood that each spoke in turn is subjected to direct perpendicular pressure hence there is a constant relative movement between the rim and spokes which allows for shock or vibration and renders movement of the vehicle comparatively easy and comfortable to the occupant.

From the foregoing description, taken in connection with the accompanying drawing, the advantages of the construction and of the method of operation will be readily apparent to those skilled in the art to which the invention appertains, and while I have described the principle of operation of the invention, together with the device which I now consider to be the embodiment thereof, I desire to have it understood that the device shown is merely illustrative and that such changes may be made when desired as are within the scope of the claims appended hereto.

Having thus described the invention what is claimed as new, is:—

1. In a vehicle wheel the combination of a hub, cylinders radiating from the hub, rods provided at their inner ends with pistons arranged to operate in the cylinders, a rim, keepers secured to the inner side of the rim and having their middle portions spaced from said rim and provided with longitudinal slots, and cross heads confined in the spaces formed between the inner side of the rim and the parts of the keepers spaced therefrom, said cross heads being adjustably secured to the outer ends of the rods which pass through the slots in the middle portions of the keepers.

2. In a vehicle wheel the combination of a hub, cylinders radiating from the hub, piston rods mounted in the cylinders and having their outer ends threaded, a rim, keepers secured at intervals to the inner side of the rim and having their middle portions spaced therefrom and formed with longitudinal slots to receive the outer threaded ends of the piston rods, cross heads confined between the rim and slotted portions of the keepers and adjustably mounted upon the threaded ends of the piston rods, and plates closing opposite sides of the keepers and the slotted portions thereof.

In testimony whereof I affix my signature in presence of two witnesses.

ENAN M. DEAL.

Witnesses:
  JOHN L. FLETCHER,
  V. B. HILLYARD.

---

Copies of this patent may be obtained for five cents each, by addressing the "Commissioner of Patents, Washington, D. C."